May 15, 1951     F. H. S. ROSSIRE     2,553,280
STICK CONTROLLER FOR AUTOMATIC PILOTS

Filed Sept. 30, 1948     2 Sheets-Sheet 1

INVENTOR.
F. HENRY S. ROSSIRE
BY
-ATTORNEY-

May 15, 1951        F. H. S. ROSSIRE        2,553,280

STICK CONTROLLER FOR AUTOMATIC PILOTS

Filed Sept. 30, 1948        2 Sheets-Sheet 2

INVENTOR.
F. HENRY S. ROSSIRE
BY
-ATTORNEY-

Patented May 15, 1951

2,553,280

UNITED STATES PATENT OFFICE 2,553,280

STICK CONTROLLER FOR AUTOMATIC PILOTS

Francis Henry S. Rossire, Leonia, N. J., assignor to Bendix Aviation Corporation, Teterboro, N. J., a corporation of Delaware Application September 30, 1948, Serial No. 51,959

10 Claims. (Cl. 74—471)

This invention relates to automatic pilot systems for aircraft and more particularly to an improved flight controller for an automatic pilot for controlling and maneuvering aircraft through the automatic pilot system.

This application is a continuation-in-part of my copending application for Flight Controller for Automatic Pilots bearing Serial No. 15,325 and filed on March 17, 1948.

In my aforesaid application I provided a stick controller to maneuver an aircraft through the automatic pilot system thereon, the movement of the control stick disconnecting the direction signal source and the altitude control signal source. The control stick provided in my previous application was so arranged that signal transmitters connected to the respective pitch and bank channels of the pilot system were actuated to provide electrical signals responsive to the degree and direction of the displacement of the control stick. The signals thus provided were impressed on the automatic pilot system and varied or overcame the electrical signals developed by the attitude devices of such a system. My previous stick controller was provided with two axes of rotation corresponding to a pitch and bank axes of the craft. A brake device was provided for each axis of oscillation of the control stick to permit the control stick to remain in the position at which it had been moved manually by the pilot. The brake members of my previous controller were formed in such a manner that stops were provided to limit the degree of oscillation of the stick about the axes.

An object of my present invention is to provide a stick controller for an automatic pilot system in which a universal connection is incorporated to permit universal movement of the control stick and in which a simple brake arrangement is provided for holding the control stick in the position to which it has been moved.

It is a further object of my invention to provide in a stick controller for an automatic pilot system a centering device which will positively and accurately center the control stick in its universal connection which corresponds to the mutually perpendicular bank and pitch axes of the aircraft on which it is mounted.

Another object of this invention is to provide a stick controller for an automatic pilot system of the character indicated in which the signal developing devices operated by the movement of the control stick about its vertical or neutral position are housed in a gas tight enclosure, the movement of the control stick being transmitted to such units through resilient seals.

A further object of this invention is to provide a stick controller for an automatic pilot system of the general character indicated which shall consist of relatively few and simple parts readily accessible for adjustment and repair, which shall be positive in its action, have a large variety of application, and yet be practical and efficient to a high degree in use.

Other objects of the invention will in part be obvious and in part hereinafter pointed out.

In the accompanying drawings forming a part of this specification in which one of the several illustrative embodiments of my invention is disclosed and in which similar reference characters designate corresponding parts throughout the several views, Fig. 1 is a longitudinal section of my stick controller taken approximately along the line 1—1 of Fig. 2, portions of which are shown in elevation;

Fig. 4 is a schematic diagram showing the linkage interconnecting the control stick and the bank transmitter of the unit; while

Figure 2:
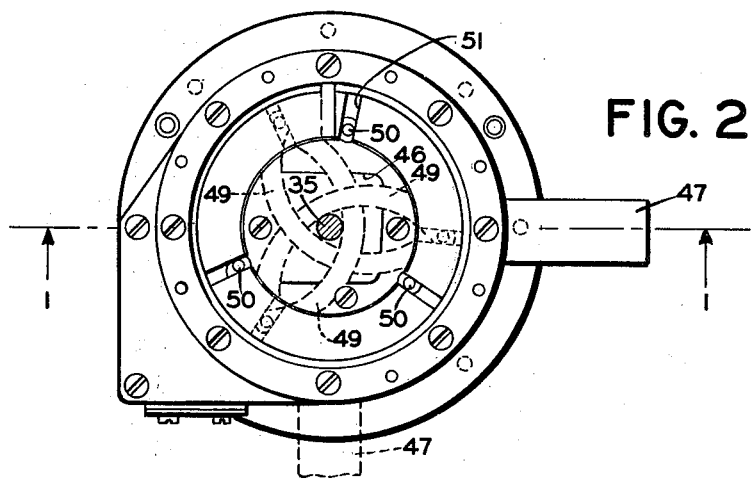
Fig. 2 is a plan view showing the centering device for the control stick and is taken approximately along the line 2—2 of Fig. 1.
Figure 1:
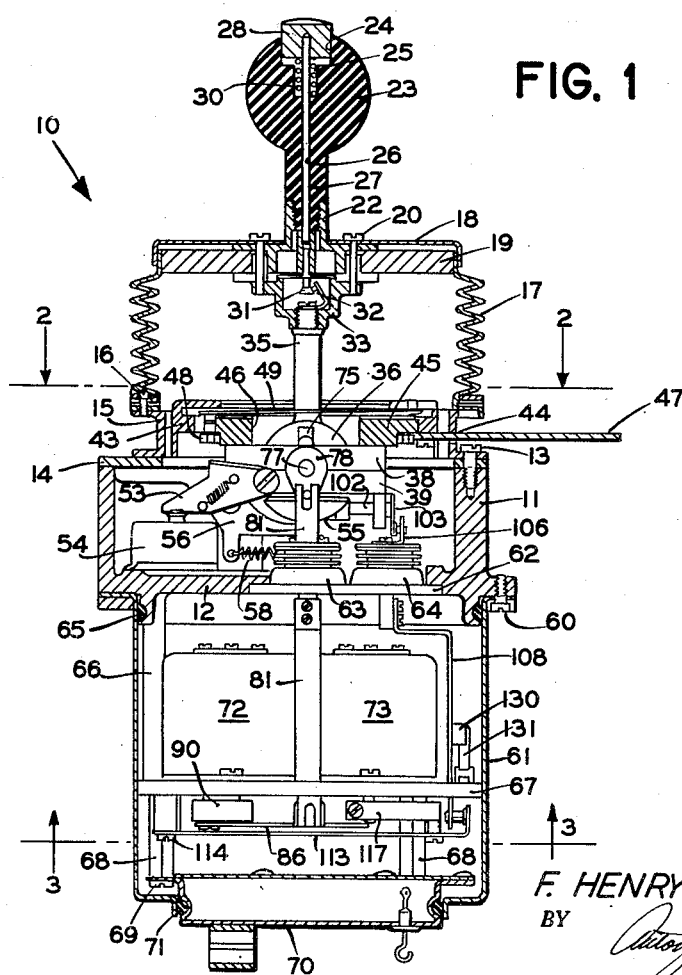
Figure 3:
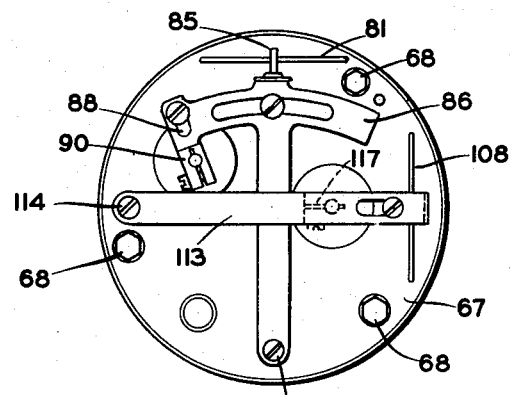
Fig. 3 is a bottom plan view of the stick controller linkage taken along the line 3—3 of Fig. 1.

Referring now in detail to Figs. 1, 2 and 3 of the drawings, numeral 10 designates a stick controller embodying my invention. The stick controller 10 is provided with a circular housing 11 open at the top portion thereof and provided with a bottom wall 12 partially sealing the bottom of said housing, and formed with dependent members to be hereinafter described. Fixed to the top wall of the housing 11, as by screws 13, is a supporting plate 14 and an arcuate flanged member 15. Fixed to the flanged member 15 as by screws 16, is a Sylphon or bellows 17 sealed at its upper end by a cap 18 and supported by a plate 19 fixed thereto as by screws 20 in the manner hereinafter described. The screws 20 in addition to fastening the cap 18 and the plate 19 also hold a threaded support 22. Threaded within the support 22 is a normally vertical knob 23 made of insulating material and provided with longitudinal openings 24, 25 and 26 therein. Slidably received within the opening 26 of the knob 23 is a stem 27 having integral therewith at its upper end a button 28 received within the opening 24. The stem 27 and button 28 are held in the position shown by a small compression spring 30 within the opening 25 of the knob. For purposes hereinafter appearing, the lower portion of the stem 27 is provided with an electrical contact 31, insulated from said stem and adapted to engage a stationary contact 32 fixed with a dependent circular member 33 fastened to the underside of plate 19 by the screws 20. Depressing the button 28 against the bias of the spring 30 will move the stem 27 downwardly to open the switch formed by the contacts 31 and 32.

Figure 4:
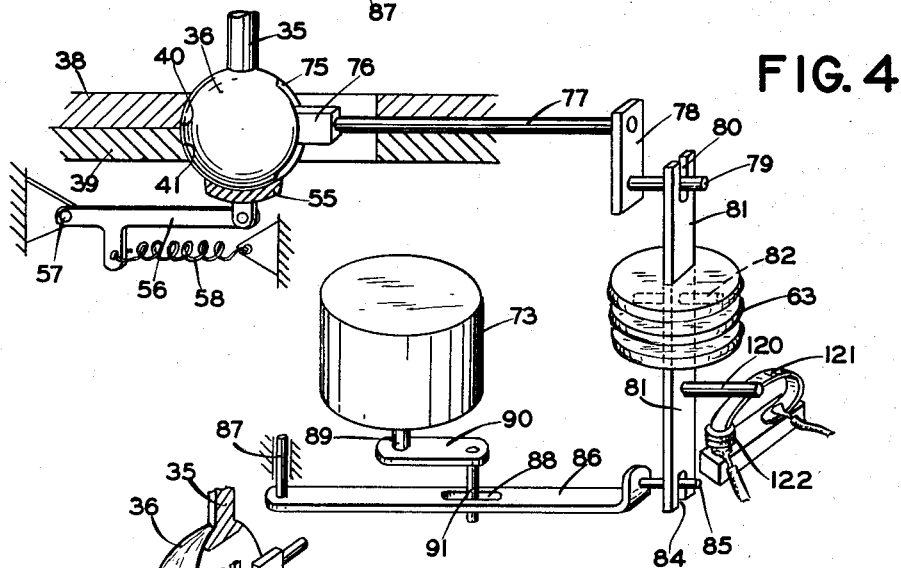

Threaded into the dependent member 33 is a rod 35 having integral therewith at its lower end a ball or sphere 36 (Fig. 4). The ball 36 is supported within the two plates 38 and 39 fixed in the housing 11, and are provided with a centrally disposed opening having arcuate faces 40 and 41 registering with the surface of the ball 36 to provide a bearing surface therefore (Fig. 4). The rod 35 passes through an enlarged opening of an iris supporting member 43 rotatably mounted within the flanged member 15 and supported on plate 38 by a stop member 45. The stop member 45 is provided with a square formed opening 46 which acts as a limit stop for the rod 35. The iris supporting member 43 has fixed thereto an arm 47 which extends out through a slot 44 cut in the flanged member 15. Supported on the stop member 45 and pivoted thereto as by pivots 48, are three iris arms 49, the free ends of which are provided with upstanding pins 50 which engage in the radial slots 51 cut into the iris supporting member 43; the iris arms 49 extending across the opening 46 of the stop member 45 and encompassing the rod 35. A pin (not shown) operates a cam lever 53 to actuate a switch 54 fixed to the bottom wall 12 for connecting the power supply to the system when the control stick is centered by the iris arrangement described.

In Fig. 2 the operation of the iris is illustrated. With the lever 47 in the position shown, the rod 35 may be freely oscillated within the bearing surface of the ball 36. Clockwise rotation of the arm 47 to the dotted line position shown in Fig. 2 will rotate the iris supporting member 43 in a clockwise direction to pivot the iris arms 49 about their respective pivots by reason of the pin and slot connection 50—51 to encompass the rod 35 to move the same into its vertical or neutral position as shown in Fig. 1. A spring, not shown, returns the iris arms to open position upon release of the arm 47 to permit free movement of the rod.

From the description thus far made, it will be evident that the control knob 23 and the rod 35 form an integral control stick, the bellows 17 being supported thereby against collapse. The control stick may be moved in any direction within the limits of the stop member 45 in the bearing surface provided for the ball 36. While a universal joint for the control stick has been described it will become apparent as the description progresses that two axes of oscillation are provided therefore corresponding to the bank and pitch axes of the aircraft. The Sylphon or bellows 17 provided seals the enclosure 11 from dirt and weather conditions and protects the iris centering device described.

To permit the retention of the control stick thus described in the position to which it has been moved, a simple and practical arrangement is provided comprising a brake shoe 55 adapted to engage the lower surface of the ball 36. The shoe 55 is supported on a lever 56 pivoted as at 57 within the housing 11 and spring urged against the ball by a coil spring 58 fixed to said lever and to said housing in suitable manner. The pressure of the brake shoe 55 exerted by the spring 58 will retain the control stick in any position; the brake pressure, however, being insufficient to offer any great resistance to the movement of the stick by the pilot.

Fixed dependently to the housing 11 as by screws 60 is an enclosure 61, the interior of said enclosure being sealed from the housing 11 by a plate 62 fixed across the opening thereof, and provided with two Sylphon or bellows 63 and 64 for the purposes hereinafter appearing. The enclosure 61 is further sealed to provide a gas tight enclosure by means of a resilient gasket 65 placed between said enclosure and the housing 11. Integral with the bottom wall 12 of the housing and depending therefrom into the enclosure 61 are three supports 66 (one being illustrated) to which is fixed a platform 67. Fixed to said platform as by spacers 68 and screws 69 is a cover plate 70 sealing the enclosure 61 as by a resilient gasket 71. Fixed to the platform 67 by suitable means are two self-synchronous transmitters or synchros 72 and 73 of the Autosyn type. The transmitter 72 will hereinafter be referred to as the pitch transmitter, while transmitter 73 will be referred to as the bank transmitter.

Means is now provided to rotate the rotor (not shown) of the transmitters in response to the movement of the control stick to develope a signal voltage responsive to the degree and direction of displacement of the control stick from a neutral or zero position.

Figure 5:
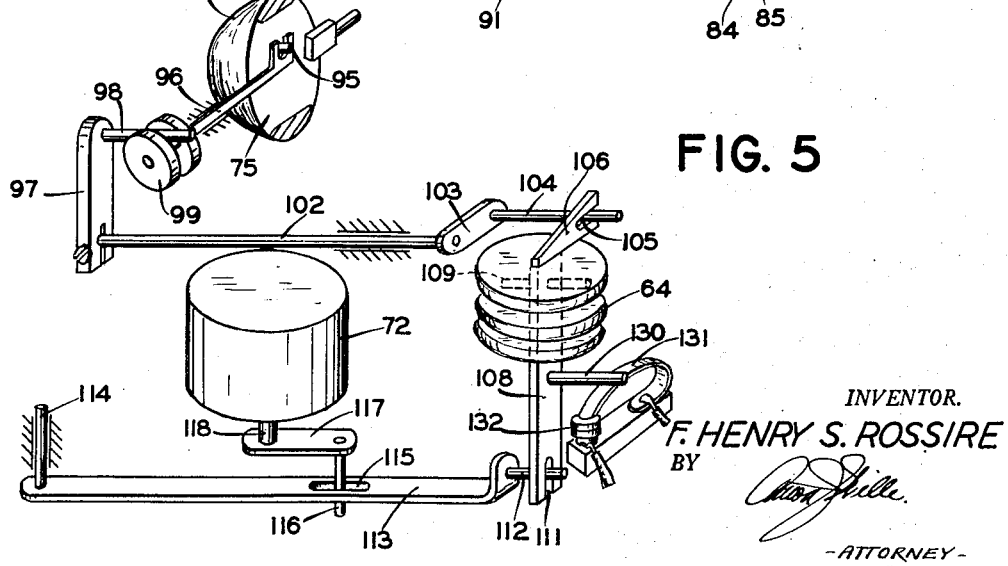
Fig. 5 is a schematic diagram similar to Fig. 4 showing the operation of the pitch transmitter.

In the description to follow herein, oscillation of the control stick about an axis in the plane of the paper will be considered the pitch axis of an aircraft on which such a stick controller is mounted, while the movement of the control stick about an axis at right angles to the plane of the paper will be considered the bank axis of the aircraft (Fig. 1). In Figs. 4 and 5 the linkage system of the control stick to the rotors of the respective transmitters is shown in schematic form, the elements to be described being indicated in the Figs. 1, 2 and 3.

To develope a signal for controlling the craft about its bank axis by oscillation of the control stick, the rotor of the bank transmitter is connected by a series of links to the ball 36 of the control stick. The ball 36 is formed with a through slot 75 in the plane of the bank axis. Fixed within said slot is a block 76 to which is fastened a rod 77 having fixed at its outer end an arm 78. The lower end of the arm 78 is provided with a pin 79 registering with a slot 80 of a lever 81 pivoted as at 82 in the housing 11; the lever 81 passing through the Sylphon 63 sealing the enclosure 61. The lower end of the lever 81 is also formed with a slot 84 and receives a pin 85 of a pivoted arm 86. The arm 86 is pivoted as at 87 in the plate 67 and is formed with an elongated slot 88 near the median point thereof. The rotor shaft 89 of the bank transmitter 73 has fixed thereto a crank arm 90, the pin 91 of which is received within the slot 88 of the arm 86. Oscillation of the control stick about the bank axis will thus rock the arm 78. The lever 81 will thus be moved to rock the arm 86. Arm 86 oscillating about its pivot 87 will oscillate the crank 90 to position the rotor of the transmitter with respect to the stator windings (not shown) thereof to develop the desired electrical signals to control the aircraft.

A similar arrangement is provided for developing pitch signals by the transmitter 72 upon movement of the control stick about the pitch axis (Fig. 5). The ball 36 is provided with a pin 95 eccentrically mounted with respect to the center of the ball within the slot 75 thereof. A link 96 having a bifurcated end for holding said pin transmits the oscillatory motion of the ball to a crank arm 97 by means of a pin 98 in said arm and an arcuate slot connection 99 on said link. The crank 97 is fixed to one end of a rod 102, the other end of which has fixed thereto a crank arm 103. The free end of the arm 103 is provided with a pin 104 which is received in a slot 105 of a bifurcated lever 106 fastened to the top of the Sylphon 64. A lever 108 pivoted as at 109 has its upper end fixed to the underneath side of the top of the Sylphon 64. A slot 111 in the end of the lever receives a pin 112 fixed into the end of an arm 113 pivoted as at 114 in the plate 67. The arm 113 is provided with an elongated slot 115 which is adapted to receive a pin 116 fixed in the end of a crank arm 117 on the rotor shaft 118 of the pitch transmitter 72.

Oscillation of the control stick about the pitch axis of the craft will, due to the eccentric connection of the link 96 with the ball 36, oscillate the crank arm 97. The crank arm 97 will in turn rock the arm 103 to oscillate the lever 106. Since the lever 106 is made integral with the top of the Sylphon 64 and the lever 108 is integral with the underside thereof, the lever 108 will in turn be rocked by the motion of the arm 103. Lever 108 through the pin and slot connection 111, 112 will oscillate the arm 113 to position the rotor with respect to the stator winding (not shown) of the transmitter 72.

Means are also provided to disconnect the source of directional signals and to disconnect the altitude control signals of the automatic pilot system.

To this end the bank lever 81 is provided with a pin 120 which normally abuts the bowed central portion of a spring 121 forming a switch 122 located in the directional signal channel of the automatic pilot system. When the pin 120 is in its neutral position, that is when the control stick is in its vertical position, the switch 122 is closed. Movement of the control stick about the bank axis will shift the pin 120 with respect to the switch spring 121 permitting the same to open and cut out the source of direction signal of the system. The switch 31, 32 and switch 122 are series connected in the pilot circuit so that the direction signal source may be disconnected at either point.

The pitch lever 108 is provided with a similar pin 130 abutting the spring 131 of a switch 132 in the altitude control circuit of the pilot system. When the control stick is in its neutral position about the pitch axis, the switch 132 will be closed by the pin 130. Movement of the stick will permit the switch 132 to open in the same manner as switch 122 upon movement of the control stick.

It will thus be seen that there is provided a stick controller for an automatic pilot system in which the several objects of this invention are achieved, and which is well adapted to meet the conditions of practical use.

As various embodiments may be made of the above invention, and as various changes may be made in the embodiment above described, it will be understood that all matter herein contained or shown in the accompanying drawings, is to be interpreted as illustrative and not in a limiting sense.

Having thus described my invention, I claim as new and desire to secure by Letters Patent:

1. A stick controller for automatic pilot systems for mobile craft comprising a bearing surface, a normally vertical control stick mounted for universal oscillation in said bearing surface, stop means for limiting the movement of said control stick in said bearing surface, a brake to retain said stick in the position to which it has been moved, and centering means for moving said control stick to its vertical position from the position to which it had been moved.

2. A stick controller for automatic pilot systems for mobile craft comprising a bearing surface, a normally vertical control stick mounted for universal oscillation in said bearing surface, stop means for limiting the movement of said control stick in said bearing surface, a brake to retain said stick in the position to which it has been moved, centering means for moving said control stick to its vertical position from the position to which it had been moved, signal transmitters for the bank channel and the pitch channel of the pilot system, and means interconnecting said control stick and said transmitters for developing a signal by said transmitters responsive to the movement of the control stick.

3. A stick controller for automatic pilot systems for mobile craft comprising a bearing surface, a normally vertical control stick mounted for universal oscillation in said bearing surface, stop means for limiting the movement of said control stick in said bearing surface, a brake to retain said stick in the position to which it has been moved, centering means for moving said control stick to its vertical position from the position to which it had been moved, signal transmitters for the bank channel and the pitch channel of the pilot system, means interconnecting said conrtol stick and said transmitters for developing a signal by said transmitters responsive to the movement of the control stick, and switch means in the electrical circuits of the pilot system adapted to be actuated by said control stick upon movement thereof from its vertical position.

4. A stick controller for automatic pilot systems for mobile craft comprising a housing, a bearing surface within said housing, a ball mounted in said surface for rotation therein, a normally vertical control stick integral with said ball extending beyond said housing, stop means for limiting the movement of said control stick, a bellows fixed to said housing through which said control stick extends forming a flexible seal for said housing, a spring biased brake for said ball within said housing for retaining the control stick in the position to which it has been moved, and centering means within said housing for returning the control stick to its vertical position.

5. A stick controller for automatic pilot systems for mobile craft comprising a housing, a bearing surface within said housing, a ball mounted in said surface for rotation therein, a normally vertical control stick integral with said ball extending beyond said housing, stop means for limiting the movement of said control stick, a bellows fixed to said housing through which said control stick extends forming a flexible seal for said housing, a spring biased brake for said ball within said housing for retaining the control stick in the position to which it has been moved, centering means within said housing for returning the control stick to its vertical position, an enclosure coextensive with said housing and opening therein, signal transmitters in said enclosure, Sylphon means sealing said enclosure from said housing, and means connected to said ball for operating said transmitters upon rotation of said ball by said control stick, said last means passing through the resilient seals formed by said Sylphon means from said housing to said transmitters within said enclosure.

6. A stick controller for automatic pilot systems for mobile craft comprising a bearing surface, a normally vertical control stick mounted for universal oscillation in said bearing surface, stop means for limiting the movement of said control stick, a brake to retain said stick in the position to which it has been moved, and an iris arrangement encompassing said stick for returning the same to its vertical position from the position to which it has been moved.

7. A stick controller for automatic pilot systems for mobile craft comprising a housing, a bearing surface within said housing, a ball mounted in said surface for rotation, a normally vertical control stick integral with said ball extending beyond said housing, a stop means in said housing for limiting the movement of said stick, and an iris encompassing said stick for returning said stick to its vertical position.

8. A stick controller for automatic pilot systems for mobile craft comprising a housing, a bearing surface within said housing, a ball mounted in said surface for rotation, a normally vertical control stick integral with said ball extending beyond said housing, a stop means in said housing for limiting the movement of said stick, an iris encompassing said stick for returning said stick to its vertical position, and a brake shoe biased against said ball for retaining the same in its position to which it has been moved by displacement of said stick.

9. A stick controller for automatic pilot systems for mobile craft comprising a housing, a bearing surface within said housing, a ball mounted in said surface for rotation, a normally vertical control stick integral with said ball extendnig beyond said housing, a stop means in said housing for limiting the movement of said stick, an iris encompassing said stick for returning said stick to its vertical position, a brake shoe biased against said ball for retaining the same in its position to whch it has been moved by displacement of said stick, an enclosure coextensive with said housing and opening therein, signal transmitters in said enclosure Sylphon means sealing said enclosure from said housing, and means eccentrically connected to said ball for operating said transmitters upon rotation thereof by displacement of said stick, said last means passing through said Sylphon means from said housing to said transmitters in said enclosure.

10. A stick controller for automatic pilot systems for mobile craft comprising a housing, a bearing surface within said housing, a ball mounted in said surface for rotation, a normally vertical control stick integral with said ball extending beyond said housing, a stop means in said housing for limiting the movement of said stick, a Sylphon fixed to said housing integral with said control stick forming a flexible seal for said housing, an iris encompassing said stick for returning said stick to its vertical position, a brake shoe biased against said ball for retaining the same in its position to which it has been moved by displacement of said stick, an enclosure coextensive with said housing and opening therein, signal transmitters in said enclosure, Sylphon means sealing said enclosure from said housing, and means eccentrically connected to said ball for operating said transmitters upon rotation thereof by displacement of said stick, said last means passing through said Sylphon means from said housing to said transmitters in said enclosure, and switch means in the electrical circuits of the pilot system adapted to be actuated by said last means when said control stick is displaced from its vertical position.

F. HENRY S. ROSSIRE.

REFERENCES CITED

The following references are of record in the file of this patent:

UNITED STATES PATENTS

| Number | Name | Date |
| --- | --- | --- |
| 1,550,416 | Barling | Aug. 18, 1925 |
| 1,987,733 | Dussumier | Jan. 15, 1935 |
| 2,122,306 | Volz et al. | June 28, 1938 |